(12) United States Patent
Covington et al.

(10) Patent No.: US 9,836,089 B1
(45) Date of Patent: Dec. 5, 2017

(54) RESIZING OF EMISSIVE DISPLAYS FOR AVIONICS APPLICATIONS

(71) Applicant: Rockwell Collins, Inc., Cedar Rapids, IA (US)

(72) Inventors: Blake P. Covington, Mount Vernon, IA (US); Ricky J. Johnson, Shellsburg, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 54 days.

(21) Appl. No.: 14/724,984

(22) Filed: May 29, 2015

(51) Int. Cl.
*G06F 1/16* (2006.01)
*H05B 33/10* (2006.01)

(52) U.S. Cl.
CPC .......... *G06F 1/1654* (2013.01); *G06F 1/1652* (2013.01); *H05B 33/10* (2013.01)

(58) Field of Classification Search
CPC ............................... G06F 1/1654; H05B 33/10
See application file for complete search history.

(56) References Cited

U.S. PATENT DOCUMENTS

| | | | |
|---|---|---|---|
| 2013/0115845 A1* | 5/2013 | Tannas, Jr. ........ | G02F 1/133351 445/2 |
| 2013/0278624 A1* | 10/2013 | Abe ...................... | G09G 5/363 345/619 |
| 2015/0002398 A1* | 1/2015 | Nakhimov ............ | G06F 1/1652 345/163 |
| 2015/0062035 A1* | 3/2015 | Choi ...................... | G06F 3/047 345/173 |
| 2015/0062525 A1 | 3/2015 | Hirakata | |

* cited by examiner

*Primary Examiner* — Joseph L Williams
(74) *Attorney, Agent, or Firm* — Angel N. Gerdzhikov; Donna P. Suchy; Daniel M. Barbieri

(57) ABSTRACT

An emissive avionics display unit includes a thin, flexible emissive display surface that may be resized for reuse in a larger or smaller housing. The display surface may be removed from its housing and folded over, rolled over, or cut along an axis of the surface so that a smaller visible portion remains on which images may be displayed by the emissive display unit's drive electronics. The display surface may also be increased in size by unfolding or unrolling previously folded or unrolled portions. Resizing allows the emissive display surface and its drive electronics to be reused or customized to fit display housings of nonstandard shape or size, which housings may in turn be designed to conform to a broad variety of cockpit sizes and available surface areas.

13 Claims, 7 Drawing Sheets

RESIZING OF EMISSIVE DISPLAYS FOR AVIONICS APPLICATIONS

TECHNICAL FIELD

The inventive concepts disclosed herein relate generally to avionics displays installed in aircraft cockpits, and more particularly to resizable emissive displays installable aboard a variety of aircraft.

BACKGROUND

The amount of interior surface area available within aircraft is at a premium, especially so within the cockpit. As a result, cockpit design must maximize the available square inches of surface area for displays and gauges. Large-area displays may make versatile use of space, but smaller displays and gauges must still fit around larger displays. As airframe sizes vary, so do cockpit sizes. A display layout designed for a smaller cockpit may not maximize usable space in a larger cockpit. Similarly, a layout designed for a larger cockpit may not fit in a smaller cockpit. The end result is point solutions to the display arrangement problem. Due to the low volume and high cost associated with development, customized emissive displays for the avionics market are generally not cost effective. An emissive display refers generally to a display that, as opposed to liquid crystal displays, does not require a backlight. It may therefore be desirable to improve the customizability and reusability of emissive avionics display components to more efficiently maximize usable surface area across a broad variety of cockpit sizes.

SUMMARY

In one aspect, embodiments of the inventive concepts disclosed herein are directed to an emissive avionics display unit configured to display images to a viewer. In one embodiment, the emissive avionics display unit includes a housing. In one embodiment, the emissive avionics display unit includes a display substrate coupled with the housing, the display substrate having a plurality of emissive devices and including a visible portion and a non-visible portion. In one embodiment, the emissive avionics display unit includes drive electronics electronically coupled to the plurality of emissive devices, the drive electronics configured to drive the plurality of emissive devices to display at least one image on the visible portion of the display substrate.

In a further aspect, the inventive concepts disclosed herein are directed to a method for repurposing an emissive avionics display unit of a first aircraft for installation in a second aircraft, the emissive avionics display unit including a display substrate removably positioned in a first housing associated with the first aircraft (i.e., sized to meet the requirements of the first aircraft/cockpit). In addition, the display surface may have a visible portion corresponding to the first housing and a first non-visible portion. In one embodiment, the method includes removing the display substrate from the first housing. In one embodiment, the method includes resizing the first visible portion of the display substrate into a second (i.e., smaller or larger) visible portion, the second visible portion corresponding to a second housing associated with the second aircraft. In one embodiment, the method includes positioning the resized display surface in the second housing. In one embodiment, the method includes installing the display unit into the second aircraft.

BRIEF DESCRIPTION OF THE DRAWINGS

The invention may be better understood by those skilled in the art by reference to the accompanying figures in which.

DETAILED DESCRIPTION

Features of the inventive concepts disclosed herein in their various embodiments are exemplified by the following descriptions with reference to the accompanying drawings, which describe the invention with further detail. It is to be understood that both the foregoing general description and the following detailed description are exemplary and explanatory only and are not necessarily restrictive of the inventive concepts disclosed and claimed herein. These drawings depict only selected embodiments of the invention, and should not be considered to limit its scope in any way.

Figure 1A:
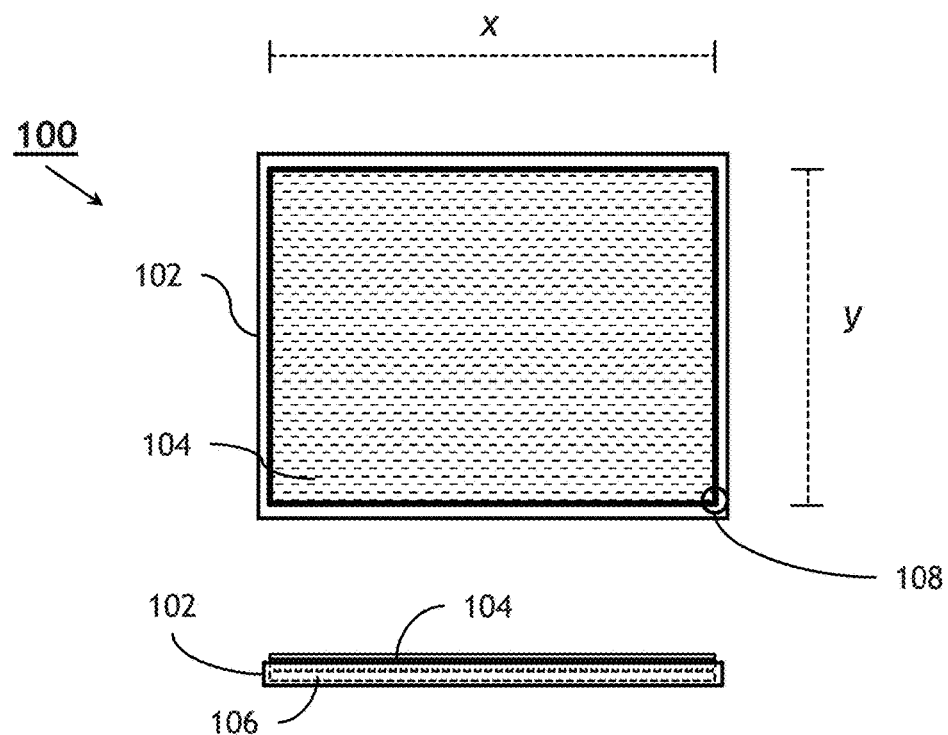
FIG. 1A is a front/side view of an embodiment of an emissive avionics display unit according to an exemplary embodiment of the inventive concepts disclosed herein.
Figure 1B:
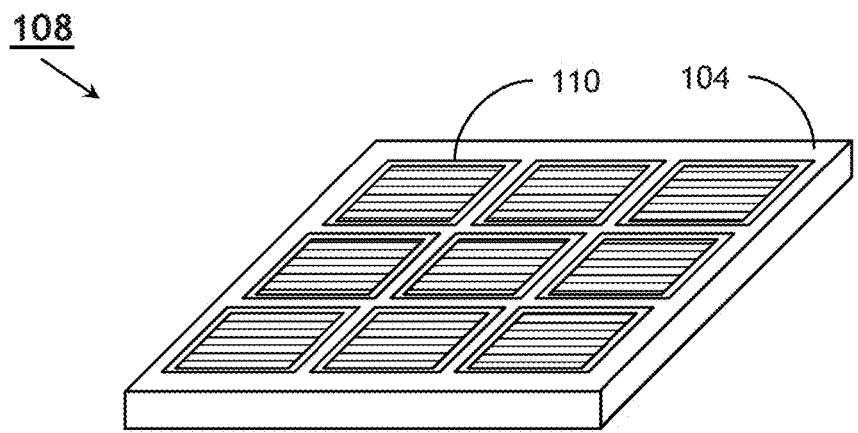
FIG. 1B is an inset view of a display surface of an emissive avionics display unit according to an exemplary embodiment of the inventive concepts disclosed herein.

FIG. 1A illustrates an embodiment of an emissive display unit 100 for avionics applications according to the inventive concepts disclosed herein. The display unit 100 may include a housing 102, the housing 102 surrounding at least a portion of a display surface (ex.—display substrate) 104 and including drive electronics 106 therein. As shown by inset view 108 of emissive display unit 100, illustrated by FIG. 1B, the housing 102 may further include an array of emissive devices 110. The display surface 104 may be a thin, flexible, translucent surface having a width X and a height Y and sized to fit the housing 102. The drive electronics 106 may in turn be connected to onboard processors and sensors (not shown) as well as the emissive devices 110 situated within the housing 102. The emissive devices 110 may include organic light-emitting diodes (OLED). The housing 102 may be sufficiently thin and flexible so as to comprise a thin substrate within which the display surface 104 and the emissive devices 110 are deposited or situated. In addition, the housing 102 and the display surface 104 may be sufficiently thin and flexible so that the emissive display unit 100 may have a generally convex, concave, adjustably planar, or nonplanar surface.

Figure 2:
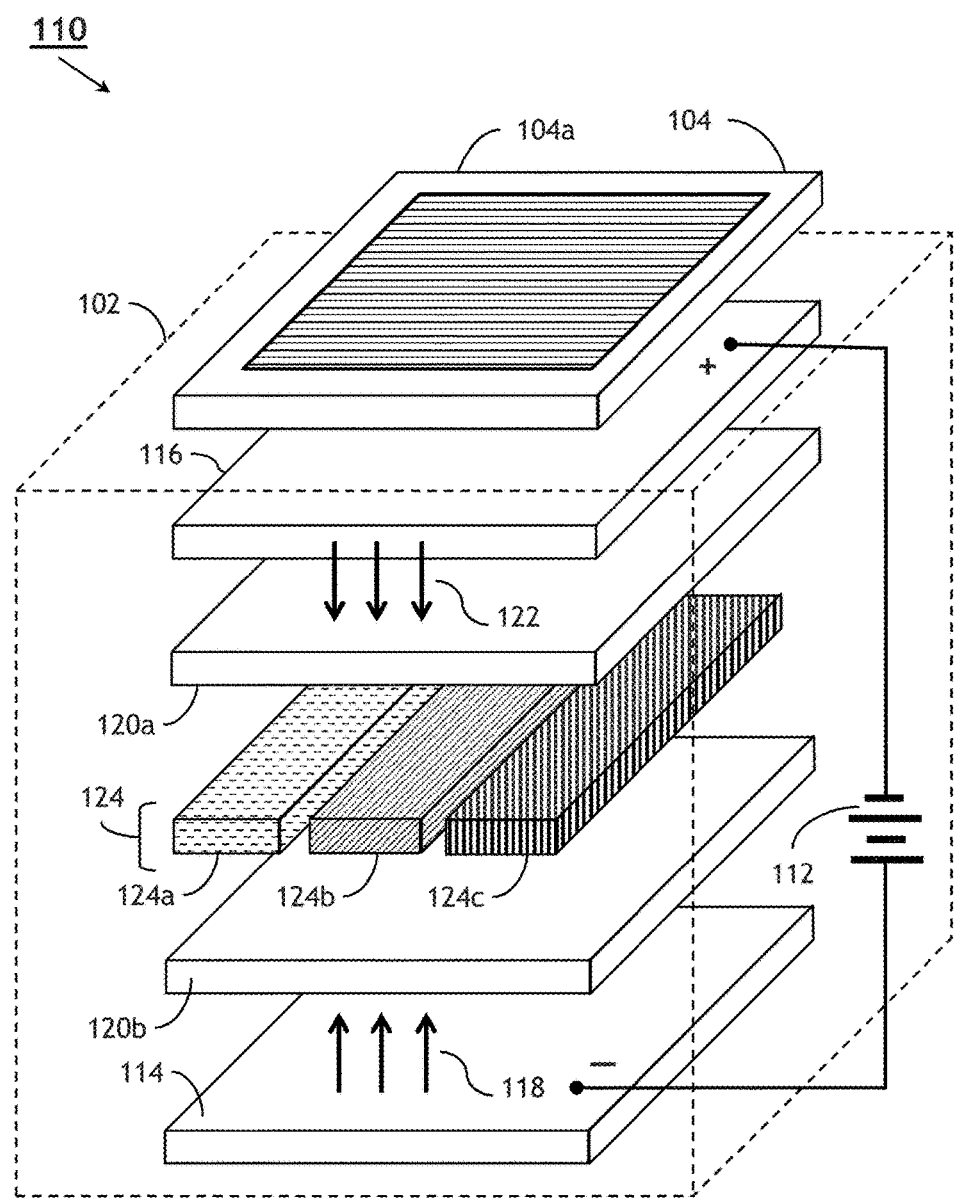
FIG. 2 is an exploded view of an emissive device of an emissive display unit according to an exemplary embodiment of the inventive concepts disclosed herein.

Referring to FIG. 2, the emissive devices 110 may incorporate multiple sandwiched layers. Each emissive device 110 may include one or more layers of material positioned between a cathode layer 114 and an anode layer 116, the anode layer 116 proximate to the display surface 104. For example, the cathode layer 114 and the anode layer 116 may comprise an array of vertical or horizontal bars spanning the width X or the length Y of the display surface 104, defining an emissive device 110 at each point of intersection. The drive electronics 106 may include a drive circuit (ex.—voltage source) 112 configured to apply a voltage across one or more emissive devices 110 so that a current of electrons 118 flows through the emissive device 110 from the cathode layer 114 to the anode layer 116. The emissive device 110 may include one or more conductive layers 120 (e.g., a hole transport layer 120a, an electron transport layer 120b) configured to inject or transport electrons 118 from the cathode layer 114, and electron holes 122 (positively charged absences of electrons) from the anode layer 116, through one or more emissive layers 124 comprising organic light-emitting material. For example, the emissive layers 124 of an emissive display unit 100 configured for color display (e.g., RGB) may comprise emissive material configured to emit red (124a), green (124b), and blue (124c) light. The emissive device 110 may thereby compare to an individual pixel visible (104a) on the display surface 104, with variances in color defined by the emissive output of red materials 124a, green materials 124b, and blue materials 124c, and variances in brightness defined by variances in the current supplied by the drive circuit 112.

Figure 3A:
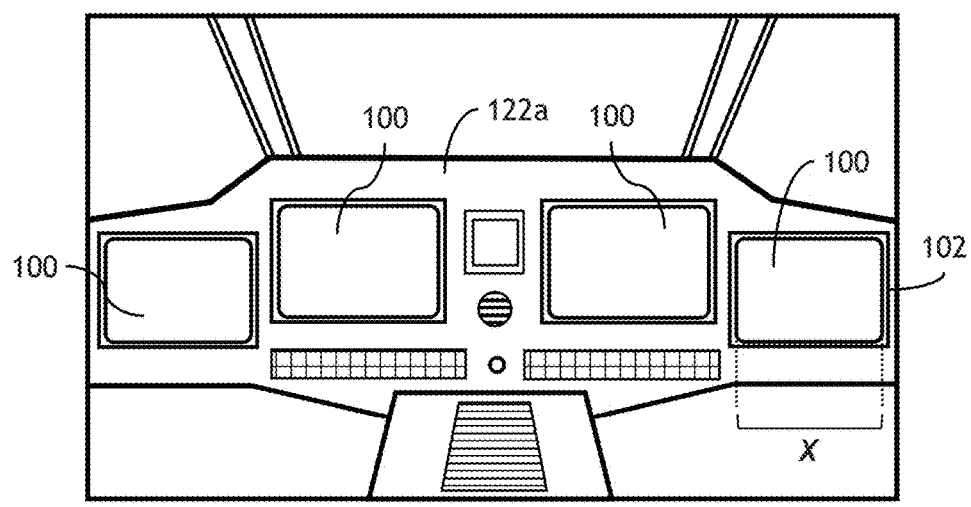
FIGS. 3A and 3B are front views of the interior surfaces of aircraft cockpits.
Figure 3B:
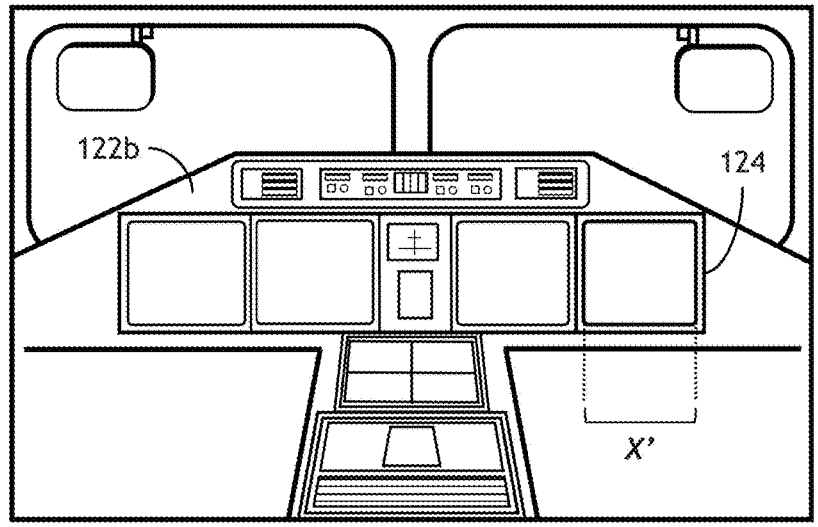

FIG. 3A illustrates a first aircraft cockpit 120a. The dashboard 122a (ex.—interior surface/s) of the first aircraft cockpit 120a may have sufficient surface area to accommodate four emissive display units 100 as well as additional gauges and displays. Each individual emissive display unit 100 may be situated in a housing 102 and include a display surface 104 having a width X. FIG. 3B illustrates a second aircraft cockpit 120b. The second aircraft cockpit 120b may have a dashboard 122b with a smaller overall surface area, capable of accommodating four alternative housings 124, each alternative housing 124 having a width X' less than the width X of the housing 102 shown by FIG. 3A.

Figure 4A:
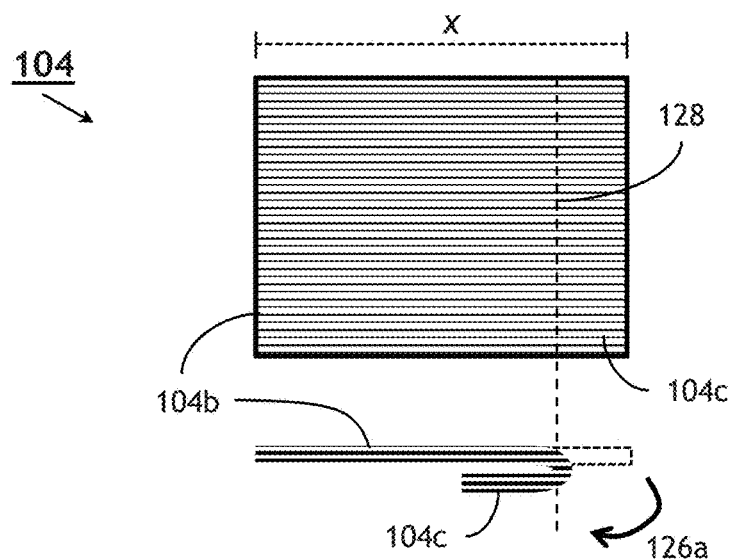
FIG. 4A is front/side view of a display surface of an emissive avionics display unit according to the inventive concepts disclosed herein.
Figure 4B:
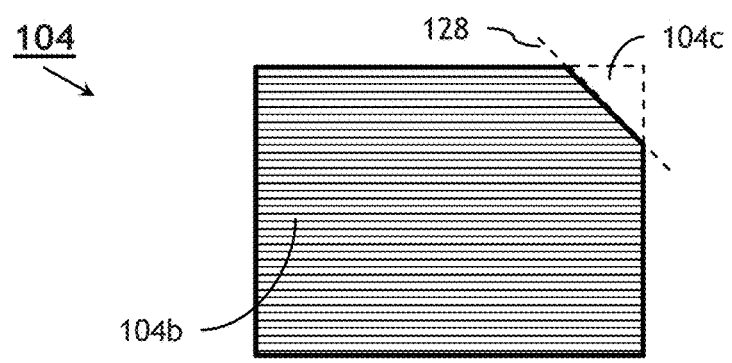
FIG. 4B is a front view of a display surface of an emissive avionics display unit according to the inventive concepts disclosed herein.
Figure 4C:
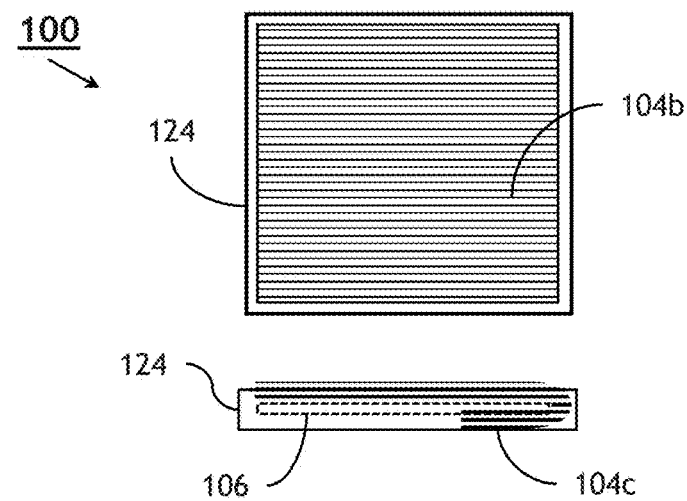
FIG. 4C is a front/side view of an emissive avionics display unit according to the inventive concepts disclosed herein.

Referring to FIGS. 4A and 4B, the display surface 104 of the emissive display unit 100 may be resized by folding a non-visible (ex.—obscured) portion 104c behind the visible portion 104b of the display surface 104. In one embodiment, as shown by FIG. 4A, the non-visible portion 104c is defined by any axis 128 parallel to the width X or the length Y of the display surface 104. For example, a single dimension of the display surface 104 may be reduced (i.e., reducing the width of the display surface 104 from X to X') by folding the display surface 104 (shown by arrow 126a) along a vertical or horizontal axis 128. In one embodiment, as shown by FIG. 4B, the display surface 104 may be reduced in size by folding a corner (non-visible portion 104c) under the visible portion 104b along a diagonal axis 128 of the display surface 104, in order to fit a housing of irregular size or shape (not shown). Referring to FIG. 4C, the resulting visible portion 104b may be visible to the viewer when reinstalled in an alternative housing 124 of truncated width X'. In addition, the drive electronics 106 of the emissive display unit 100 may be programmed to account for the reduced visible portion 104b by activating only those emissive devices 110 within the visible portion 104b (and not those within the non-visible portion 104c).

The display surface 104 may be made of a thin and flexible material allowing the non-visible portion 104c to be folded behind the visible portion 104b without impairing the long term functionality of the emissive devices 110 within the non-visible portion 104c. For example, a resizable display surface 104 may allow the emissive display unit 100 to fit a smaller alternative housing 124, cockpit 120b or dashboard 122b (as shown by FIG. 3B) while reusing the display surface 104 and drive electronics 106 of the original emissive display unit 100, at a significant savings as opposed to full redesign and/or manufacture of a customized emissive display unit 100 having a display surface 104 of width X'. In one embodiment, the truncated display surface 104 illustrated by FIG. 4C may be increased in size (e.g., to fit a larger housing 102, cockpit 120a, or dashboard 122a (as shown by FIG. 3A)) by unfolding the non-visible portion 104c from behind the visible portion 104b.

Figure 5A:
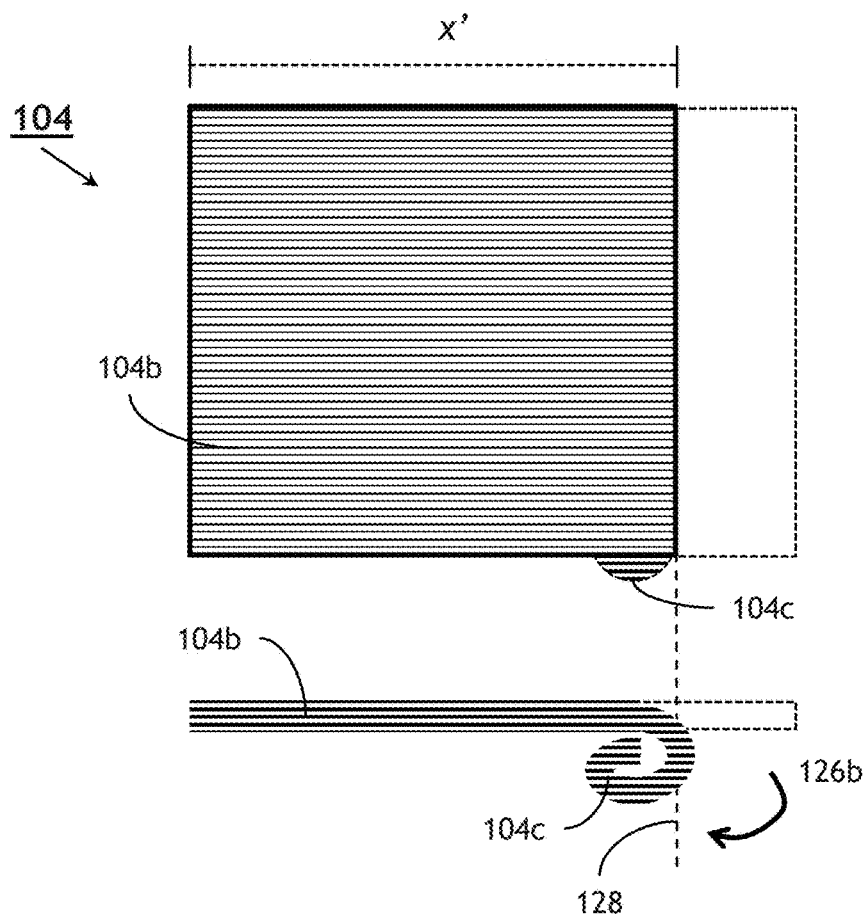
FIG. 5A is a front/side view of a display surface of an emissive avionics display unit according to the inventive concepts disclosed herein.
Figure 5B:
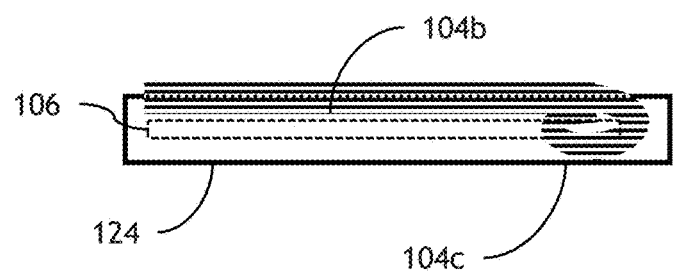
FIG. 5B is a side view of an emissive avionics display unit according to the inventive concepts disclosed herein.

Referring to FIGS. 5A and 5B, the display surface 104 of emissive display unit 100 (as illustrated by FIG. 1A) can be resized to a truncated width X' by rolling (as indicated by arrow 126b) the non-visible portion 104c under the visible portion 104b, as illustrated by FIG. 5A. For example, the non-visible (ex.—obscured) portion 104c may be rolled (126b) underneath the visible portion 104b along a vertical or horizontal axis 128 to reduce a single dimension of the display surface 104 (e.g., from width X to truncated width X'). The non-visible portion 104c may be a corner of the display surface 104 rolled underneath the visible portion 104b. In one embodiment, the resized display surface 104 may be reinstalled or repositioned in the alternative housing 124 of the emissive display unit 100, as illustrated by FIG. 4C, and the drive electronics 106 reconnected. In one embodiment, a display surface 104 is increased in size by unrolling the non-visible portion 104c from behind the visible portion 104b. For example, the display surface 104 illustrated by FIG. 5B may be restored to a width X by unrolling the non-visible portion 104c and mounting the display surface 104 (now of width X) to a housing 102 of the appropriate size.

Figure 6A:
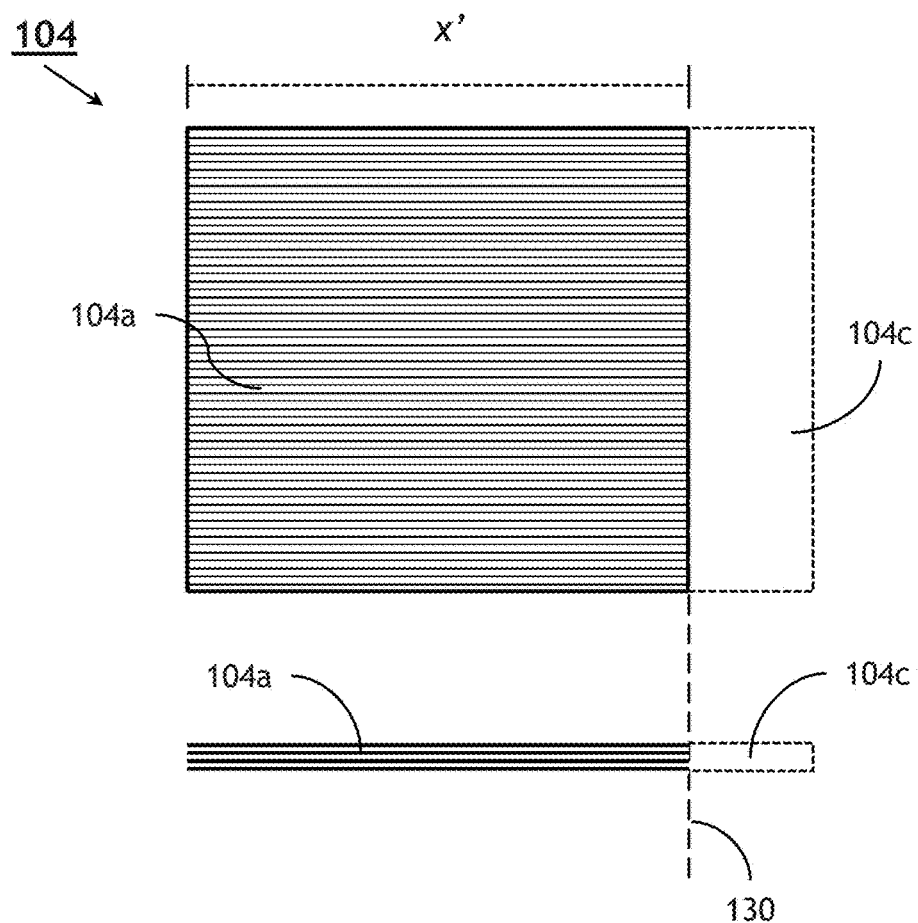
FIG. 6A is a front/side view of a display surface of an emissive avionics display unit according to the inventive concepts disclosed herein.
Figure 6B:
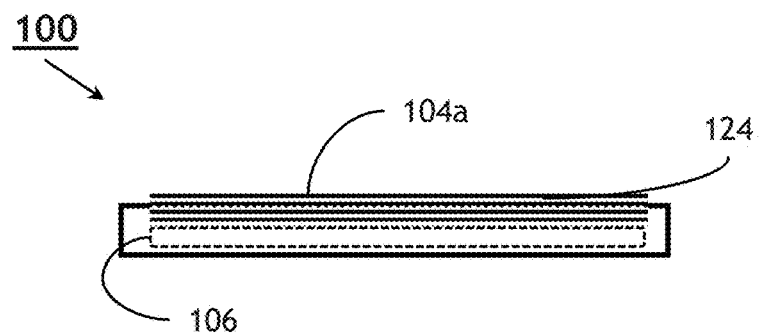
FIG. 6B is a side view of an emissive avionics display unit according to the inventive concepts disclosed herein.

Referring to FIGS. 6A and 6B, the display surface 104 of the emissive display unit 100 may be permanently reduced in size (e.g., from width X to truncated width X') by cutting (as indicated by dashed line 130) the non-visible portion 104c from the visible portion 104b. For example, the non-visible portion 104c may be cut from the visible portion 104b along a vertical or horizontal axis (as shown by dashed line 130, FIG. 6A) to reduce a single dimension of the display surface 104, or a corner or other irregular shape may be cut from the visible portion 104b of the display surface 104 so that the visible portion 104b conforms to an alternative housing 124 of truncated or irregular size.

Figure 7:
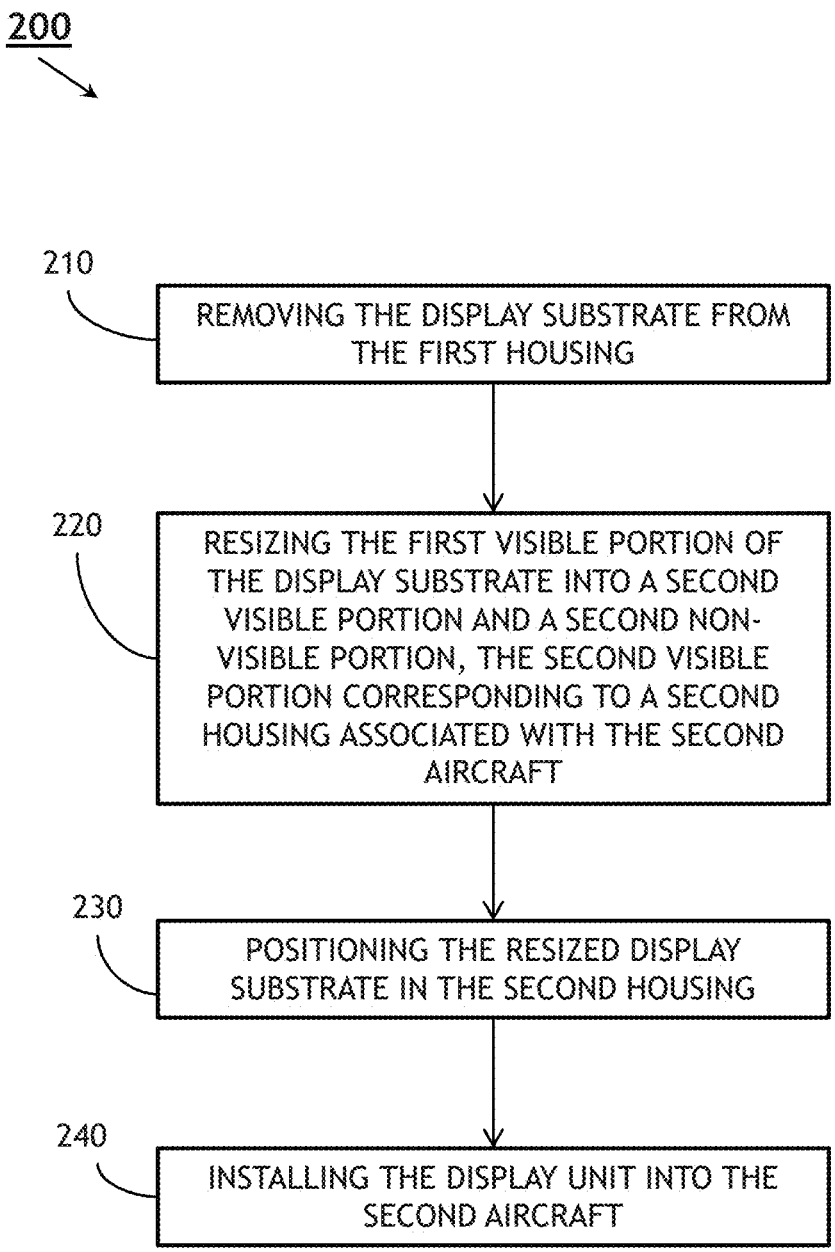
FIG. 7 is a process flow diagram illustrating a method according to the inventive concepts disclosed herein.

FIG. 7 illustrates a method 200 for repurposing an emissive display unit 100 of a first aircraft cockpit 120a for installation in a second aircraft cockpit 120b, the emissive display unit 100 including at least a display surface (ex.—display substrate) 104 removably positioned in a first housing 102 associated with the first aircraft cockpit 120a.

At step 210, the method 200 removes the display surface 104 from the first housing 102.

At step 220, the method 200 resizes the visible portion of the display surface 104 into a second visible portion 104b and a second non-visible portion 104c, the second visible portion 104b corresponding to a second housing 124 associated with the second aircraft cockpit 120b. In one embodiment, the method 200 increases the size of the first visible portion to leave a larger second visible portion 104b of the display surface 104. For example, the size of the first visible portion may be increased by unrolling a non-visible portion of the display surface from behind the first visible portion along an axis 128 of the display surface 104. The size of the first visible portion may be increased by unfolding a non-visible portion of the display surface from behind the first visible portion along an axis 128 of the display surface 104. In one embodiment, the method 200 decreases the size of the first visible portion to leave a smaller second visible portion 104b of the display surface 104. For example, the size of the first visible portion may be decreased by rolling a portion 104c of the first visible portion behind the first visible portion along an axis 128 of the display surface 104. The size of the first visible portion may be decreased by folding a portion 104c of the first visible portion behind the first visible portion along an axis 128 of the display surface 104. The size of the first visible portion may be decreased by cutting a portion 104c of the first visible portion from first visible portion along an axis 128 of the display surface 104.

At step 230, the method 200 positions the resized display surface (corresponding to second visible portion 104b) in the second housing 124.

At step 240, the method 200 installs the emissive display unit 100 into the second aircraft cockpit 120b.

We claim:

1. An emissive display unit, comprising:
 a first housing;
 a flexible display substrate coupled with the first housing, the display substrate having a plurality of emissive devices and including a visible portion and a non-visible portion coupled to the visible portion, wherein the flexible display substrate is capable of being removed from the first housing and resized to correspond with a second housing by resizing the non-visible portion coupled to the visible portion; and
 drive electronics electronically coupled to the plurality of emissive devices, the drive electronics configured to drive the plurality of emissive devices to display at least one image on the visible portion of the display substrate.

2. The emissive display unit of claim 1, wherein the plurality of emissive devices includes at least one organic light-emitting diode.

3. The emissive display unit of claim 1, wherein the non-visible portion is folded behind the visible portion.

4. The emissive display unit of claim 1, wherein the non-visible portion is rolled behind the visible portion.

5. The emissive display unit of claim 1, wherein the visible portion has at least one of a convex surface and a concave surface.

6. The emissive display unit of claim 1, wherein the emissive display unit includes an avionics display unit installable in an aircraft cockpit.

7. The emissive display unit of claim 1, wherein the non-visible portion is cut along an axis of the display substrate.

8. A method for repurposing an emissive display unit including a flexible display substrate removably positioned in a first housing, the method comprising:
 removing the display substrate from the first housing;
 resizing a visible portion of the display substrate to correspond with a second housing by resizing a non-visible portion of the display substrate, the non-visible portion coupled to the visible portion; and
 positioning the resized display substrate in the second housing.

9. The method of claim 8, wherein resizing to correspond with a second housing by resizing a non-visible portion of the display substrate, the non-visible portion coupled to the visible portion includes:
 increasing the size of the visible portion by unrolling a portion of the non-visible portion from behind the visible portion along an axis of the display substrate.

10. The method of claim 8, wherein resizing to correspond with a second housing by resizing a non-visible portion of the display substrate, the non-visible portion coupled to the visible portion includes:
 increasing the size of the visible portion by unfolding a portion of the non-visible portion from behind the visible portion along an axis of the display substrate.

11. The method of claim 8, wherein resizing a visible portion of the display substrate to correspond with a second housing by resizing a non-visible portion of the display substrate, the non-visible portion coupled to the visible portion includes:
 decreasing the size of the visible portion by rolling a portion of the visible portion behind the visible portion along an axis of the display substrate.

12. The method of claim 8, wherein resizing a visible portion of the display substrate to correspond with a second housing by resizing a non-visible portion of the display substrate, the non-visible portion coupled to the visible portion includes:
 decreasing the size of the visible portion by folding a portion of the visible portion behind the visible portion along an axis of the display substrate.

13. The method of claim 8, wherein resizing a visible portion of the display substrate to correspond with a second housing by resizing a non-visible portion of the display substrate, the non-visible portion coupled to the visible portion includes:
 decreasing the size of the visible portion by cutting a portion of the visible portion from the visible portion along an axis of the display substrate.

* * * * *